US010222654B2

(12) United States Patent
Tago

(10) Patent No.: US 10,222,654 B2
(45) Date of Patent: Mar. 5, 2019

(54) LIQUID CRYSTAL DISPLAY DEVICE COMPRISING FIRST AND SECOND PIXEL ELECTRODES RESPECTIVELY HAVING FIRST AND SECOND SLITS EACH HAVING A LONG AXIS THAT EXTENDS IN DIFFERENT DIRECTIONS

(71) Applicant: Japan Display Inc., Minato-ku (JP)

(72) Inventor: Keiji Tago, Tokyo (JP)

(73) Assignee: JAPAN DISPLAY INC., Minato-ku (JP)

( * ) Notice: Subject to any disclaimer, the term of this patent is extended or adjusted under 35 U.S.C. 154(b) by 0 days.

(21) Appl. No.: 15/847,031

(22) Filed: Dec. 19, 2017

(65) Prior Publication Data

US 2018/0120617 A1    May 3, 2018

Related U.S. Application Data

(63) Continuation of application No. 14/838,573, filed on Aug. 28, 2015, now Pat. No. 9,874,781.

(30) Foreign Application Priority Data

Sep. 1, 2014 (JP) ................................ 2014-177030

(51) Int. Cl.
*G02F 1/13363* (2006.01)
*G02F 1/1333* (2006.01)
(Continued)

(52) U.S. Cl.
CPC .... *G02F 1/13363* (2013.01); *G02F 1/133308* (2013.01); *G02F 2001/133331* (2013.01);
(Continued)

(58) Field of Classification Search
CPC ........ G02F 2001/133531; G02F 2001/133331; G02F 2413/05
See application file for complete search history.

(56) References Cited

U.S. PATENT DOCUMENTS

| 5,497,256 A | 3/1996 | Aoyama et al. |
| 2007/0236630 A1 | 10/2007 | Tago |

(Continued)

FOREIGN PATENT DOCUMENTS

| JP | 7-84249 | 3/1995 |
| JP | 8-262428 | 10/1996 |

(Continued)

OTHER PUBLICATIONS

Japanese Office Action dated Jul. 24, 2018 in Patent Application No. 2014-177030 (with English translation by Global Dossier), citing documents AA and AO—AU therein, 9 pages.

*Primary Examiner* — Paul Lee
(74) *Attorney, Agent, or Firm* — Oblon, McClelland, Maier & Neustadt, L.L.P.

(57) ABSTRACT

According to one embodiment, a liquid crystal display device includes an array substrate, a counter-substrate, a negative liquid crystal layer including liquid crystal molecules, a retardation film attached to a surface of the array substrate, a first polarizer attached to the retardation film and having a first absorption axis, a second polarizer attached to a surface of the counter-substrate, and having a second absorption axis which is parallel to a direction of initial alignment of the liquid crystal molecules and perpendicular to the first absorption axis, a cover member located opposite to the second polarizer, and ultraviolet curing resin which bonds the second polarizer and the cover member to each other.

11 Claims, 5 Drawing Sheets

(51) Int. Cl.
  *G02F 1/1343* (2006.01)
  *G02F 1/1335* (2006.01)
(52) U.S. Cl.
  CPC ............ *G02F 2001/133531* (2013.01); *G02F 2001/134372* (2013.01); *G02F 2202/28* (2013.01); *G02F 2413/05* (2013.01)

(56) References Cited

U.S. PATENT DOCUMENTS

| | | | | |
|---|---|---|---|---|
| 2009/0225262 | A1* | 9/2009 | Yanai | C09K 19/3068 349/119 |
| 2011/0285640 | A1 | 11/2011 | Park | |
| 2013/0050601 | A1* | 2/2013 | Takeda | G02F 1/134363 349/41 |
| 2013/0077028 | A1* | 3/2013 | Miyazaki | G02F 1/134363 349/99 |
| 2013/0100384 | A1* | 4/2013 | Asakawa | G02F 1/1335 349/96 |
| 2013/0128171 | A1* | 5/2013 | Kesho | G02F 1/1368 349/43 |
| 2013/0265515 | A1* | 10/2013 | Hasegawa | G02F 1/134336 349/43 |
| 2013/0278877 | A1* | 10/2013 | Kwon | G02F 1/133707 349/123 |
| 2013/0300992 | A1* | 11/2013 | Kozuka | G02F 1/1343 349/123 |
| 2014/0016043 | A1* | 1/2014 | Chen | G06F 3/041 349/12 |
| 2014/0055373 | A1 | 2/2014 | Powell et al. | |

FOREIGN PATENT DOCUMENTS

| | | |
|---|---|---|
| JP | 2007-304436 A | 11/2007 |
| JP | 2009-115834 A | 5/2009 |
| JP | 2009-282424 | 12/2009 |
| JP | 2012-78736 A | 4/2012 |
| JP | 2012-163763 A | 8/2012 |
| JP | 2013-44955 A | 3/2013 |
| JP | 2013-45021 A | 3/2013 |
| JP | 2014-26130 A | 2/2014 |

* cited by examiner

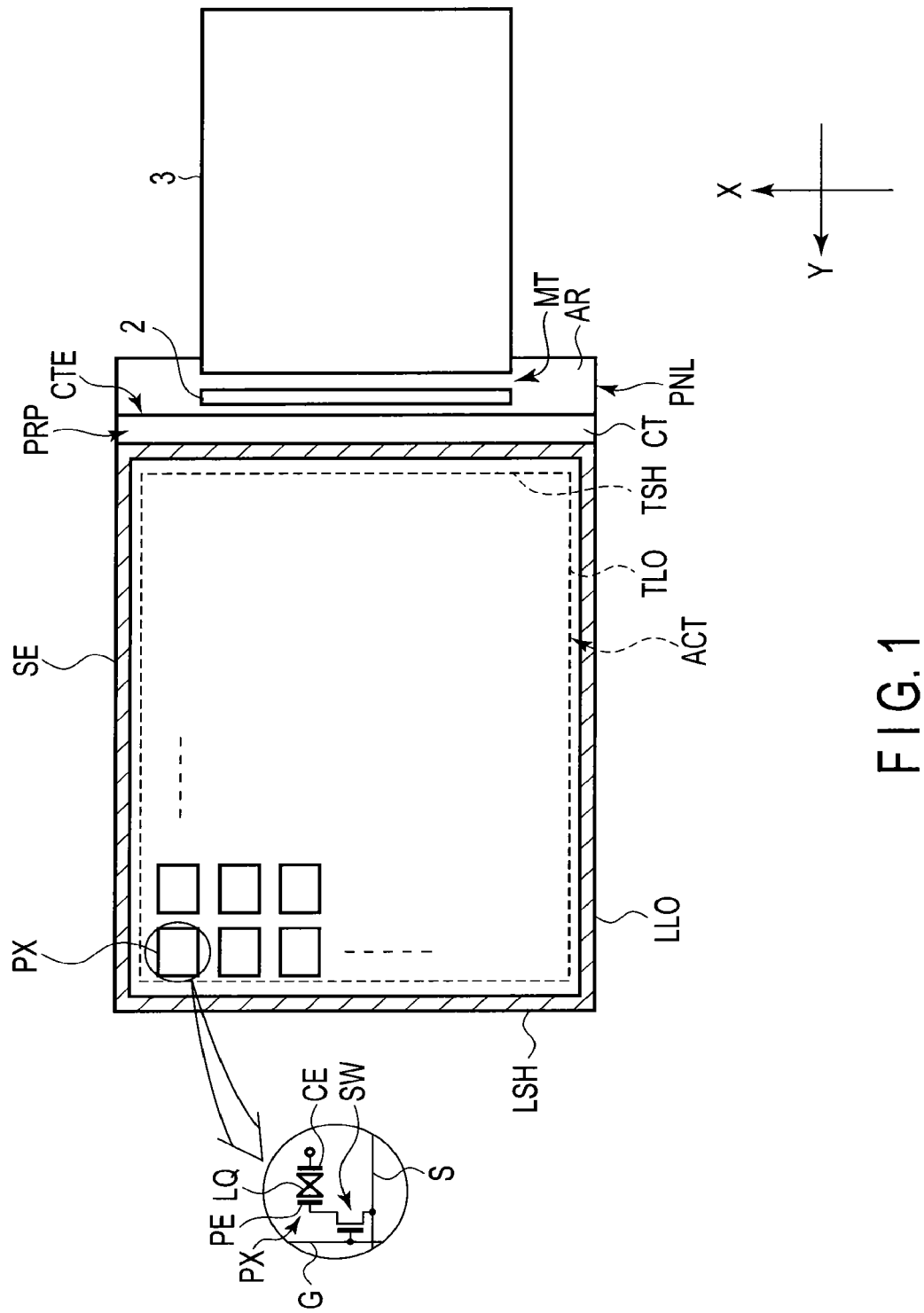
F I G. 1

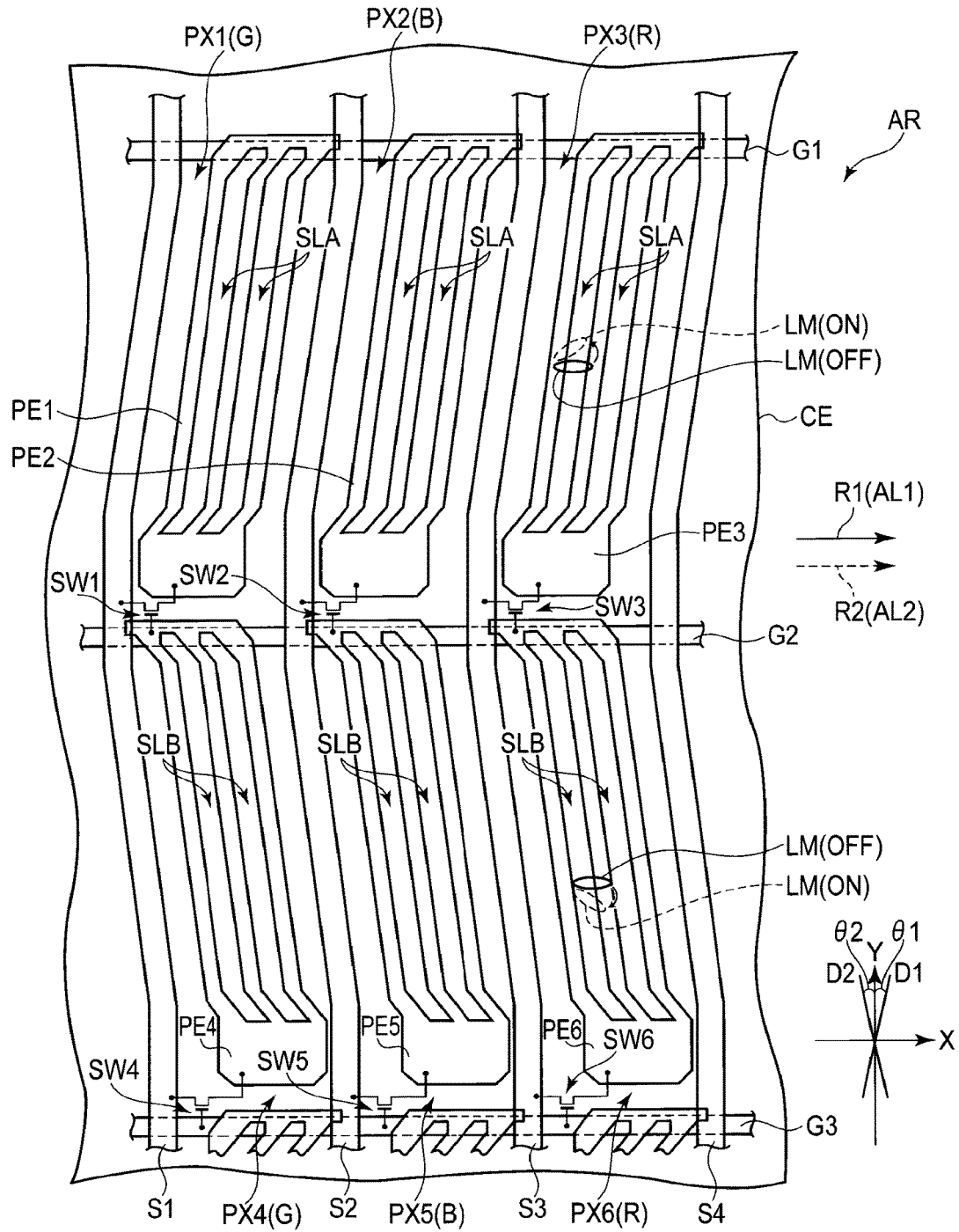
F I G. 2

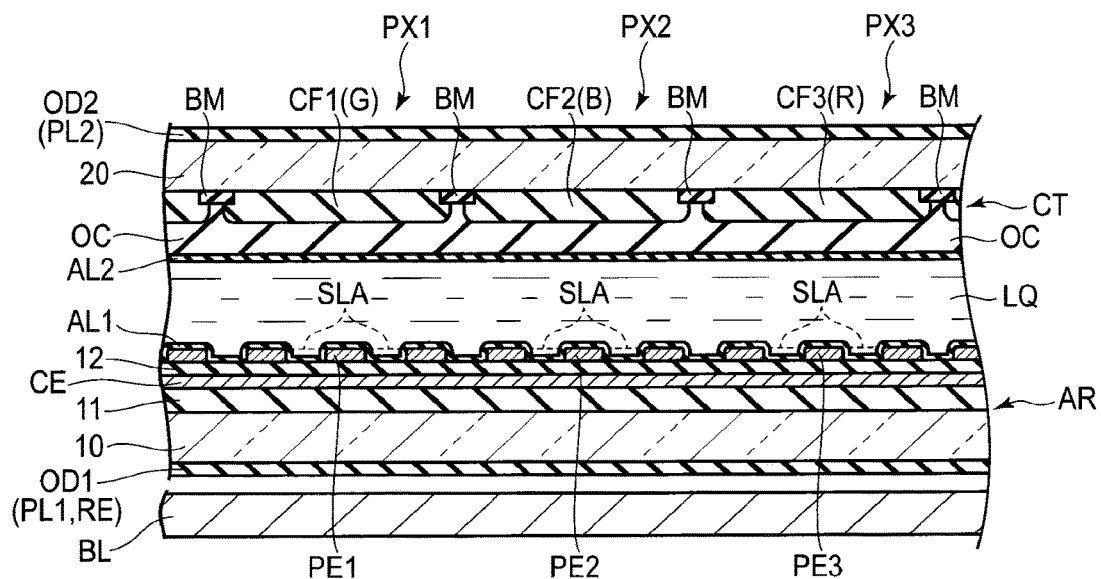
F I G. 3
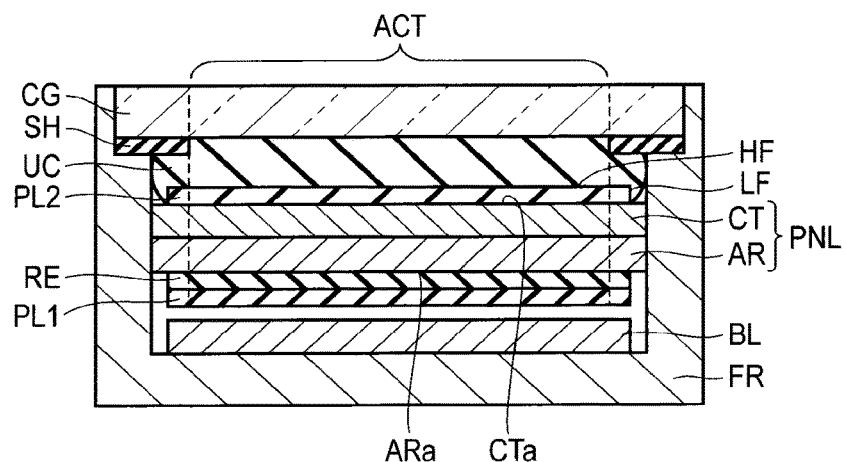
F I G. 4

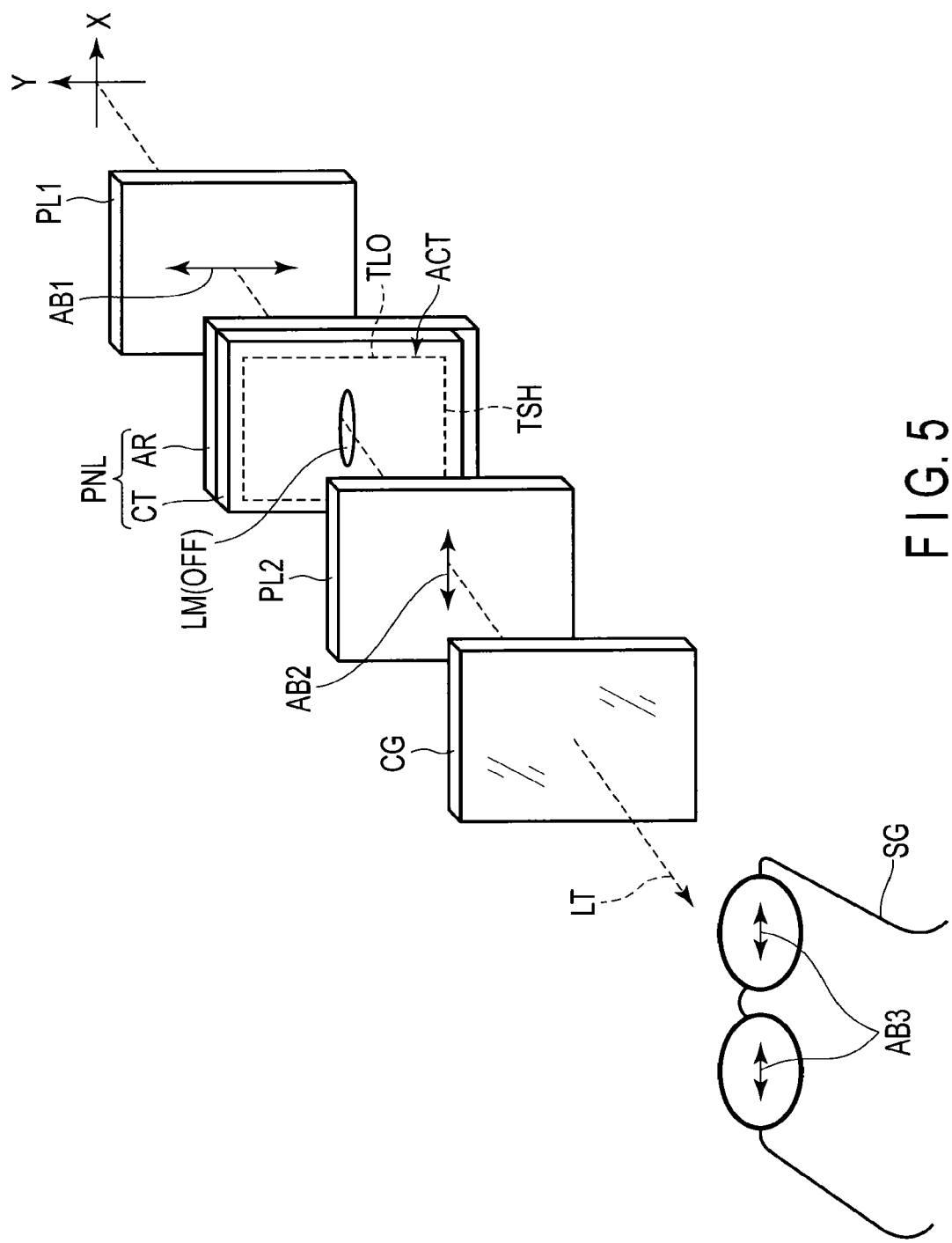
F I G. 5

US 10,222,654 B2

LIQUID CRYSTAL DISPLAY DEVICE COMPRISING FIRST AND SECOND PIXEL ELECTRODES RESPECTIVELY HAVING FIRST AND SECOND SLITS EACH HAVING A LONG AXIS THAT EXTENDS IN DIFFERENT DIRECTIONS

CROSS-REFERENCE TO RELATED APPLICATIONS

This application is a continuation of and claims the benefit of priority under 35 U.S.C. § 120 from application Ser. No. 14/838,573 filed Aug. 28, 2015, and claims the benefit of priority under 35 U.S.C. § 119 from Japanese Patent Application No. 2014-177030 filed Sep. 1, 2014, the entire contents of each of which are incorporated herein by reference.

FIELD

Embodiments described herein relate generally to a liquid crystal display device.

BACKGROUND

In recent years, a study has been made of liquid crystal display devices in which a displayed image can be viewed even by a user wearing polarized sunglasses. As such a liquid crystal display device supporting use of polarized sunglasses, a liquid crystal display is disclosed in which of protective films included in a polarizing member disposed on a display surface of a liquid crystal display panel, a protective film disposed on a display surface side has a phase-difference value.

BRIEF DESCRIPTION OF THE DRAWINGS

FIG. 1 is a view schematically showing an equivalent circuit and a configuration of a liquid crystal display panel PNL included in a liquid crystal display device according to an embodiment.

FIG. 2 is a schematic plan view showing a configuration example of pixels in an array substrate AR as shown in FIG. 1, as viewed from a counter-substrate CT side.

FIG. 3 is a cross-sectional view schematically showing a structure of the liquid crystal display panel PNL, which includes pixels PX1 to PX3 as shown in FIG. 2.

FIG. 4 is a cross-sectional view schematically showing a structure of the liquid crystal display device including the liquid crystal display panel PNL and a cover member CG.

FIG. 5 is a view schematically showing a correlation between the direction of a first absorption axis AB1 of a first polarizer PL1, the direction of initial alignment of liquid crystal molecules LM, the direction of a second absorption axis AB2 of a second polarizer PL2, and the direction of a third absorption axis AB3 of polarized sunglasses.

DETAILED DESCRIPTION

Figure 6:
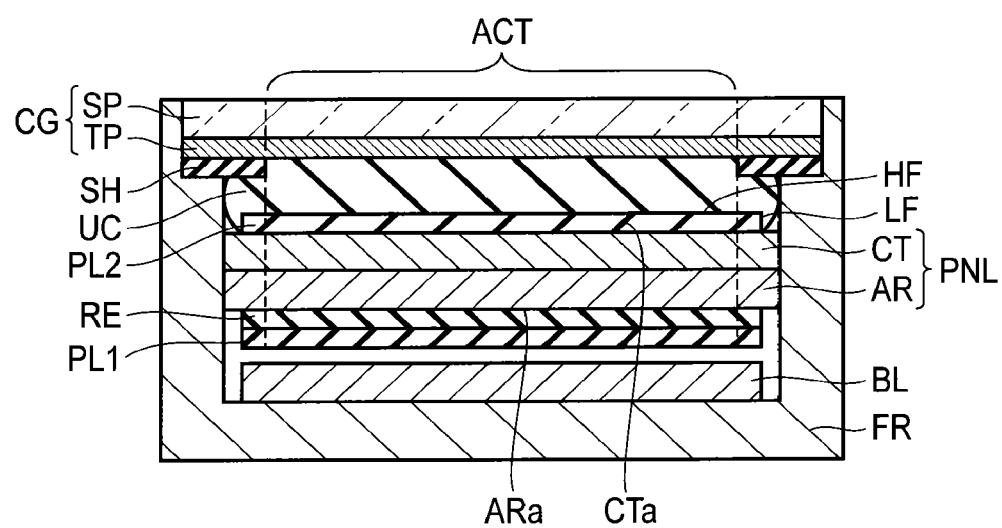
FIG. 6 is a cross-sectional view schematically showing another structure of the liquid crystal display device including the liquid crystal display panel PNL and the cover member CG.

In general, according to one embodiment, a liquid crystal display device includes: an array substrate; a counter-substrate located opposite to the array substrate; a negative liquid crystal layer including liquid crystal molecules and held between the array substrate and the counter-substrate; a retardation film attached to a surface of the array substrate; a first polarizer attached to the retardation film and having a first absorption axis; a second polarizer attached to a surface of the counter-substrate, and having a second absorption axis which is parallel to a direction of initial alignment of the liquid crystal molecules and perpendicular to the first absorption axis; a cover member located opposite to the second polarizer; and ultraviolet curing resin bonding the second polarizer and the cover member to each other.

Embodiments will be described hereinafter with reference to the accompanying drawings. It should be noted that they are disclosed as mere examples; and needless to say, if they are modified as appropriate by a person with ordinary skill in the art without changing the subject matter of the invention, such modifications fall within the scope of the invention as long as they can be easily conceived by a person with ordinary skill in the art. In addition, in some cases, in order to make the description clearer, the widths, thicknesses, shapes, etc. of parts are schematically illustrated in the drawings, compared to the actual modes. However, the schematic illustration is merely an example, and adds no limitations to the interpretation of the embodiments. Furthermore, in the specification and drawings, structural elements, which have functions identical or similar to the functions described in connection with preceding drawings, are denoted by the same reference numbers, respectively, as those described previously, and an overlapping detailed description or descriptions thereof are omitted unless otherwise necessary.

FIG. 1 is a view schematically showing an equivalent circuit and a configuration of a liquid crystal display panel PNL included in a liquid crystal display device according to an embodiment.

To be more specific, the liquid crystal display panel PNL is of an active matrix transmissive type, and comprises an array substrate AR, a counter-substrate CT located opposite to the array substrate AR and a liquid crystal layer LQ held between the array substrate AR and the counter-substrate CT. The array substrate AR and the counter-substrate CT are attached to each other by a sealant SE, with a predetermined cell gap provided between the array substrate AR and the counter-substrate CT. In an example shown in FIG. 1, the sealant SE is formed in the shape of a rectangular frame and in a manner of a closed loop. The liquid crystal layer LQ is located within the region surrounded by the sealant SE and held between the array substrate AR and the counter-substrate CT. The liquid crystal display panel PNL includes an active area ACT for displaying an image, within the region surrounded by the sealant SE. The active area ACT is, for example, substantially rectangular, and comprises a plurality of pixels PX arranged in a matrix. In an example, the active area ACT has short sides TSH substantially parallel to a first direction X and long sides TLO substantially parallel to a second direction Y. It should be noted that the first direction X is perpendicular to the second direction Y. Also, the liquid crystal panel PNL (or the array substrate AR and the counter-substrate CT) are also rectangularly formed, and has short sides LSH substantially parallel to the first direction X and long sides LLO substantially parallel to the second direction Y.

In the active area ACT, the array substrate AR comprises a gate line G extending in a direction parallel to the short sides TSH (i.e., extending in the first direction X), a source line S extending in a direction parallel to the long sides TLO (i.e., extending in the second direction Y), a switching element SW electrically connected to the gate line G and the source line S in the pixel PX, respectively, and the pixel electrode PE connected to the switching element SW in the pixel PX, respectively, and a common electrode CE having a common potential.

Although a detailed structure of the liquid crystal display panel PNL will be described later, the liquid crystal display panel PNL according to the embodiment is configured to adopt a mode in which a lateral electric field is primarily applied, and the pixel electrode PE and the common electrode CE are both provided at the array substrate AR.

Signal supply sources necessary to drive the liquid crystal display panel PNL, which are a drive IC chip 2, a flexible printed circuit (FPC) substrate 3, etc., are provided in a peripheral area PRP located outward of the active area ACT. In the example shown in FIG. 1, the drive IC chip 2 and the FPC substrate 3 are mounted on a mounting portion MT of the array substrate AR, which is located outward of a substrate end portion CTE of the counter-substrate CT. The peripheral area PRP is an area surrounding the active area ACT, includes an area where the sealant SE is located, and is formed in the shape of a rectangular frame.

FIG. 2 is a schematic plan view showing a configuration example of pixels in the array substrate AR as shown in FIG. 1, as viewed from a counter-substrate CT side. It should be noted that FIG. 2 shows only a main portion which needs to be referred to in explanations to be given below.

The array substrate AR comprises gate lines G1 to G3, source lines S1 to S4, switching elements SW1 to SW6, the common electrode CE, pixel electrodes PE1 to PE6, a first alignment film AL1, etc.

The gate lines G1 to G3 extend in substantially parallel with the first direction X. The source lines S1 to S4 extend in substantially parallel with the second direction Y, and cross the gate lines G1 to G3. It should be noted that the gate lines G1 to G3 and the source lines S1 to S4 need not always to linearly extend, and they may be partially bent. The gate lines G1 to G3 and the source lines S1 to S4 define the pixels PX1 to PX6. The gate lines G1 to G3 and the source lines S1 to S4 are formed of, for example, molybdenum, chromium, tungsten, aluminum, copper, titanium, nickel tantalum, silver or an alloy of any elements selected from those elements; however, the materials of the gate lines and source lines are not limited to those elements; that is, they may be formed of another metal, another alloy or another laminate film.

The pixels PX1 to PX3 arranged in the first direction X are color pixels having different colors, and the pixels PX4 to PX6 are also color pixels having different colors. In an example, the pixels PX1 and PX4 arranged in the second direction Y are color pixels having the same color, for example, green (G) pixels. Also, the pixels PX2 and PX5 arranged in the second direction Y are color pixels having the same color, for example, blue (B) pixels. The pixels PX3 and PX6 arranged in the second direction Y are color pixels having the same color, for example, red (R) pixels.

The pixel PX1 is defined by the gate lines G1 and G2 and the source lines S2 and S2; the pixel PX2 is defined by the gate lines G1 and G2 and the source lines S2 and S3; and the pixel PX3 is defined by the gate lines G1 and G2 and the source lines S3 and S4. The pixels PX1 to PX3 extend in a first extension direction D1 crossing the second direction Y at an acute angle in a clockwise direction. The source lines S1 to S4, each of which is located on both sides of an associated one of the pixels PX1 to PX3, extend in the first extension direction D1.

The pixel PX4 is defined by the gate lines G2 and G3 and the source lines S1 and S2; the pixel PX5 is defined by the gate lines G2 and G3 and the source lines S2 and S3; and the pixel PX6 is defined by the gate lines G2 and G3 and the source lines S3 and S4. The pixels PX4 to PX6 extend in a second extension direction D2 crossing the second direction Y at an acute angle in a counterclockwise direction. The source lines S1 to S4, each of which is located on both sides of an associated one of the pixels PX4 to PX6, extend in the second extension direction D2. It should be noted that angle θ1 at which the second direction Y and the first extension direction D1 cross each other (i.e., the crossing angle θ1 thereof) is substantially equal to angle θ2 at which the second direction Y and the second extension direction D2 cross each other (i.e., the crossing angle θ2 thereof), and those crossing angles are each, for example, approximately 5 to 15°.

The common electrode CE is provided on substantially the entire area of the array substrate AR and in common for the pixels PX1 to PX6. To be more specific, the common electrode CE extend over the gate lines G1 to G3 in the second direction Y and over the source lines S1 to S4 in the first direction X, and provided for the pixels PX1 to PX6.

In the pixel PX1, the switching element SW1 and the pixel electrode PE1 are provided. The switching element SW1 is electrically connected to the gate line G2 and the source line S1. The pixel electrode PE1 is located between the source lines S1 and S2, and electrically connected to the switching element SW1. In the pixel PX2, the switching element SW2 and the pixel electrode PE2 are provided. The switching element SW2 is electrically connected to the gate line G2 and the source line S2. The pixel electrode PE2 is located between the source lines S2 and S3, and electrically connected to the switching element SW2. In the pixel PX3, the switching element SW3 and the pixel electrode PE3 are provided. The switching element SW3 is electrically connected to the gate line G2 and the source line S3. The pixel electrode PE3 is located between the source lines S3 and S4, and electrically connected to the switching element SW3.

Similarly, in the pixel PX4, the switching element SW4 electrically connected to the gate line G3 and the source line S1 and the pixel electrode PE4 electrically connected to the switching element SW4 are provided. In the pixel PX5, the switching element SW5 electrically connected to the gate line G3 and the source line S2 and the pixel electrode PE5 electrically connected to the switching element SW5 are provided. In the pixel PX6, the switching element SW6 electrically connected to the gate line G3 and the source line S3 and the pixel electrode PE6 electrically connected to the switching element SW6 are provided.

The switching elements SW1 to SW6 are, for example, thin-film transistors (TFTs). The switching elements SW1 to SW6 comprise semiconductor layers formed of, for example, poly-silicon (p-Si), amorphous silicon (a-Si), organic semiconductors, oxide semiconductors or the like.

The pixel electrodes PE1 to PE6 are located above the common electrode CE. The pixel electrodes PE1 to PE3 are formed in the shape of islands in accordance with the shapes of pixels extending in the first extension direction D1. Furthermore, the pixel electrodes PE1 to PE3 each include at least one slit SLA extending in the first extension direction D1. The pixel electrodes PE4 to PE6 are formed in the shape of islands in accordance with the shapes of pixels extending in the second extension direction D2. Furthermore, the pixel electrodes PE4 to PE6 each include at least one slit SLB extending in the second extension direction D2. The slits SLA and SLB each face the common electrode CE. In the example illustrated, the pixel electrodes PE1 to PE3 each include two slits SLA, and the pixel electrodes PE4 to PE6 each include two slits SLB. The number of slits provided in each pixel electrode is not especially limited; that is, it may be set to one or three or more.

The first alignment film AL1 is subjected to an alignment treatment in a direction which crosses at an acute angle exceeding 45° the long axes of the slits SLA (the first extension direction D1 in the example shown in FIG. 2) and the long axes of the slits SLB (the second extension direction D2 in the example shown in FIG. 2). An alignment direction R1 of the first alignment film AL1 is substantially parallel to the first direction X, and crosses the first extension direction D1 or the second extension direction D2 at an angle of less than 90°, for example, an angle of 75 to 85°. That is, preferably, the angle between the first extension direction D1 and the direction of initial alignment of liquid crystal molecules LM should fall within the range of 45 to 90°, and more preferably, it should fall within the range of 75 to 85°. Also, preferably, the angle between the first extension direction D1 and the direction of initial alignment of the liquid crystal molecules LM should be equal to that between the second extension direction D2 and the direction of initial alignment of the liquid crystal molecules LM.

FIG. 3 is a cross-sectional view schematically showing a structure of the liquid crystal display panel PNL including the pixels PX1 to PX3 as shown in FIG. 2.

The liquid crystal display panel PNL comprises the array substrate AR, the counter-substrate CT and the liquid crystal layer LQ. Furthermore, a first optical element OD1 and a second optical element OD2 are provided at an outer surface of the liquid crystal display panel PNL.

The array substrate AR comprises a first insulating substrate 10, a first insulating film 11, the common electrode CE, a second insulating film 12, the pixel electrodes PE1 to PE3, the first alignment film AL1, etc. The first insulating substrate 10 is formed of a material having light transmitting and electrical insulating properties, such as glass or resin.

The first insulating film 11 is provided above the first insulating substrate 10. Furthermore, the gate lines, the source lines and the switching elements, which are not shown in FIG. 3, are provided between the first insulating substrate 10 and the first insulating film 11.

The common electrode CE is provided on the first insulating film 11. Also, the common electrode CE is formed of a transparent conductive material such as indium tin oxide (ITO) or indium zinc oxide (IZO). The common electrode CE is covered by the second insulating film 12.

The pixel electrodes PE1 to PE3 are provided on the second insulating film 12 and opposite to the common electrode CE. In each of the pixel electrodes PE1 to PE3, the slits SLA are provided. The pixel electrodes PE1 to PE3 are each formed of a transparent conductive material such as ITO or IZO.

The first alignment film AL1 covers the pixel electrodes PE1 to PE3, and is also provided on the second insulating film 12. Also, the first alignment film AL1 is formed of a material exhibiting a horizontal alignment characteristic, and located on a surface of the array substrate AR which contacts the liquid crystal layer LQ.

On the other hand, the counter-substrate CT comprises a second insulating substrate 20, a light shielding layer BM, color filters CF1, CF2 and CF3, an overcoat layer OC, a second alignment film AL2, etc. The second insulating substrate 20 is formed of a material having light transmitting and electrical insulating properties, such as glass or resin.

The light shielding layer BM is provided on an inner surface of the second glass substrate 20 which is located opposite to the array substrate AR. The light shielding layer BM is formed of a material having a low light transmittance and a low reflectivity, i.e., a black resin material or a metal material having a light-shielding characteristic.

The color filters CF1 to CF3 are provided on an inner surface of the second insulating substrate 20. The color filter CF1 is formed of a resin material colored green. The color filter CF2 is formed of a resin material colored blue. The color filter CF3 is formed of a resin material colored red. It should be noted that another color filter may be further added as a color filter having a color (for example, a transparent filter or a white filter) different from the colors of the color filters CF1 to CF3.

The overcoat layer OC covers the color filters CF1 to CF3. The overcoat layer OC is formed of, for example, a transparent resin material.

The second alignment film AL2 covers the overcoat layer OC. The second alignment film AL2 is formed of a material exhibiting a horizontal alignment characteristic, and located on the surface of the counter-substrate CT which contacts the liquid crystal layer LQ. The first alignment film AL1 and the second alignment film AL2 are subjected to an alignment treatment for causing liquid crystal molecules of the liquid crystal layer LQ to be in an initial alignment. The alignment direction R1 of the first alignment film AL1, as shown in FIG. 2, is parallel to the first direction X. The alignment direction R2 of the second alignment film AL2 is parallel to and the same direction as the alignment direction R1. As the alignment treatment, for example, a rubbing treatment, a photo-alignment treatment or the like is applied.

The liquid crystal layer LQ contains liquid crystal molecules LM enclosed between the first alignment film AL1 of the array substrate AR and the second alignment film AL2 of the counter-substrate CT. The liquid crystal layer LQ is formed of a liquid crystal constituent whose dielectric anisotropy is negative. The liquid crystal molecules LM receive alignment restraining forces from the first alignment film AL1 and the second alignment film AL2, and are in an initial alignment such that they are located in substantially parallel with an interface between the liquid crystal layer LQ and the first alignment film AL1 and an interface between the liquid crystal layer LQ and the second alignment film AL2. In the example shown in FIG. 2, the direction of initial alignment of the liquid crystal molecules LM is parallel to the first direction X.

The first optical element OD1 is attached to a surface of the array substrate AR. The first optical element OD1 includes a retardation film RE and a first polarizer PL1. The second optical element OD2 is attached to a surface of the counter-substrate CT, and includes a second polarizer PL2. The first optical element OD1 and the second optical element OD2 are not limited to those described with respect to the above embodiment, and may each include another function layer.

At part of the liquid crystal display panel PNL which is located opposite to the first optical element OD1, a backlight unit BL is provided. As the backlight unit BL, various kinds of backlight units can be applied. However, a detailed explanation of the structure of the backlight unit BL will be omitted.

FIG. 4 is a cross-sectional view schematically showing a structure of the liquid crystal display device including the liquid crystal display panel PNL and a cover member CG.

The liquid crystal display device accommodates in a housing frame FR formed in the shape of a box, the backlight unit BL, the liquid crystal display panel PNL, the retardation film RE and the first polarizer PL1 of the first optical element OD1, the second polarizer PL2 of the second optical element OD2 and ultraviolet curing resin UC.

The cover member CG is located opposite to the counter-substrate CT of the liquid crystal display panel PNL. The cover member CG is formed of glass, resin or the like, which has a light transmitting property. The cover member CG is, for example, attached to the housing frame FR, and thus fixed thereto. In an example, the cover member CG comprises a light shielding layer SH located opposite to the liquid crystal display panel PNL. The light shielding layer SH defines the active area ACT, and also shields from light an area located outward of the active area ACT.

The backlight unit BL is provided on an inner surface of a bottom portion of the housing frame FR. The liquid crystal display panel PNL is located opposite to the backlight unit BL. The retardation film RE is attached to a surface ARa of the array substrate AR which is located opposite to the backlight unit BL. The first polarizer PL1 is attached to the retardation film RE. The second polarizer PL2 is attached to a surface CTa of the counter-substrate CT which is located opposite to the cover member CG. The retardation film RE, the first polarizer PL1 and the second polarizer PL2 are all provided in the entire active area ACT.

The ultraviolet curing resin UC bonds the second polarizer PL2 and the cover member CG to each other. The ultraviolet curing resin UC is provided in the entire active area ACT. If a certain amount of ultraviolet curing resin UC which can be provided in the entire active area ACT is applied, part of the ultraviolet curing resin UC spreads to an area located outward of the active area ACT. In the liquid crystal display device of recent times, the area outward of the active area ACT tends to be set smaller, and it is therefore harder to apply ultraviolet curing resin UC only to a surface HF of the second polarizer PL2. Thus, in the example shown in FIG. 4, the ultraviolet curing resin UC is in contact with the surface HF and side surface LF of the second polarizer PL2. Furthermore, the ultraviolet curing resin UC is also in contact with part of the surface CTa of the counter-substrate CT, which is exposed from the second polarizer PL2 to the outside thereof.

The retardation film RE is provided to, for example, compensate for a viewing angle of the liquid crystal display device. In general, a retardation film or retardation films RE are provided between the liquid crystal display panel PNL and the first polarizer PL1 and/or between the liquid crystal display panel PNL and the second polarizer PL2. In the embodiment, the retardation film RE is provided only between the liquid crystal display panel PNL and the first polarizer PL1. Thus, the retardation film RE is not in contact with the ultraviolet curing resin UC. It should be noted that the phase difference value of the retardation film RE and the direction of the phase lag axis of the retardation film RE are not especially limited, and can be selected as appropriate in accordance with the function of the liquid crystal display panel PNL and a first absorption axis AB1 of the first polarizer PL1. In an example, the retardation film RE is combined with the first polarizer PL1 into a single body in advance, and it is set that the phase lag axis of the retardation film RE and the first absorption axis AB1 cross each other at a predetermined angle.

Next, use of the liquid crystal display device according to the embodiment will be explained by referring to an example shown in FIG. 5.

FIG. 5 is a view schematically showing a correlation between the direction of the first absorption axis AB1 of the first polarizer PL1, the direction of initial alignment of the liquid crystal molecules LM, the direction of a second absorption axis AB2 of the second polarizer PL2, and the direction of a third absorption axis AB3 of polarized sunglasses SG.

The liquid crystal display device is held by a user such that the active area ACT is located in portrait orientation as viewed from the user. Also, the user views the active area ACT from the front. That is, the active area ACT is located such that its short sides TSH are substantially parallel to a horizontal direction, and its long sides TLO are substantially parallel to a vertical direction. Similarly, the first polarizer PL1, the liquid crystal display panel PNL, the second polarizer PL2 and the cover member CG all have short sides substantially parallel to the horizontal direction and long sides substantially parallel to the vertical direction. It should be noted that as shown in FIG. 1, in the embodiment, the gate line G extends in substantially parallel with the short sides TSH of the active area ACT. Also, the source line S extends in substantially parallel with the long sides TLO of the active area ACT. Therefore, when the liquid crystal display device is used, the horizontal direction corresponds to the direction of extension of the gate line G (or the first direction X), and the vertical direction corresponds to the direction of extension of the source line S (or the second direction Y). It should be noted that an arrow drawn by a broken line in such a way to penetrate the first polarizer PL1, the liquid crystal display panel PNL, the second polarizer PL2 and the cover member CG indicates the path of light LT emitted from the liquid crystal display device and visibly recognized by the user.

The first absorption axis AB1 of the first polarizer PL1 is parallel to the second direction Y. The direction of initial alignment of the liquid crystal molecules LM is parallel to the first direction X. The second absorption axis AB2 of the second polarizer PL2 is perpendicular to the first absorption axis AB1 and parallel to the first direction X. That is, the first polarizer PL1 and the second polarizer PL2 are disposed in a cross Nicol arrangement. Furthermore, the second absorption axis AB2 is parallel to the short sides TSH of the active area ACT and also parallel to the direction of extension of the gate line G. The direction of initial alignment of the liquid crystal molecules LM is parallel to the second absorption axis AB2.

On the other hand, the third absorption axis AB3 of the polarized sunglasses SG is parallel to the horizontal direction (or the first direction X) in order to block reflected sunlight from the surface of water or the like. Light LT emitted to the outside of the liquid crystal display device after passing through the cover member CG is a linear polarization substantially perpendicular to the second absorption axis AB2. Therefore, the polarization direction of the above emitted light LT is substantially perpendicular to the third absorption axis AB3 of the polarized sunglasses SG. Thus, the light LT emitted from the liquid crystal display device is visually recognized through the polarized sunglass SG.

Then, the operation of the liquid crystal display device having the above structure will be explained.

At an OFF time when a voltage which makes a potential difference between the pixel electrode PE and the common electrode CE is not applied, no voltage is applied to the liquid crystal layer LQ. That is, an electric field is not generated between the pixel electrode PE and the common electrode CE. Thus, as indicated by a solid line in FIG. 2, the liquid crystal molecules LM in the liquid crystal layer LQ are initially aligned in the first direction X in an X-Y plane by alignment restriction forces of the first alignment film AL1 and the second alignment film AL2.

At the OFF time, part of backlight from the backlight unit BL is transmitted through the first polarizer PL1 and incident on the liquid crystal display panel PNL. At this time, the light incident on the liquid crystal display panel PNL is a linear polarization perpendicular to, for example, the first absorption axis AB1 of the first polarizer PL1. Such linear polarization hardly changes when the liner polarization is transmitted through the liquid crystal display panel PNL at the OFF time. Thus, most of the linear polarization transmitted through the liquid crystal display panel PNL is absorbed by the second polarizer PL2 (black display).

Conversely, at an ON time when a voltage which makes a potential difference between the pixel electrode PE and the common electrode CE is applied, a voltage is applied to the liquid crystal layer LQ. That is, a lateral electric field (or a fringing field) substantially parallel to the X-Y plane is generated between the pixel electrode PE and the common electrode CE. Thus, as indicated by a broken line in FIG. 2, in the X-Y plane, the liquid crystal molecules LM are aligned in directions different from the direction of the initial alignment. If a negative liquid crystal material is applied, for example, liquid crystal molecules LM of the pixel PX3 are rotated in a counter-clockwise direction so that they are aligned in a direction substantially perpendicular to the fringing field in the X-Y plane, and liquid crystal molecules LM of the pixel PX6 are rotated in a clockwise direction so that they are aligned in the direction substantially perpendicular to the fringing field in the X-Y plane. At this time, the liquid crystal molecules LM are aligned in a direction according to the magnitude of the electric field.

At the ON time, a linear polarization perpendicular to the first absorption axis AB1 of the first polarizer PL1 is incident on the liquid crystal display panel PNL, and varies in accordance with the alignment state of liquid crystal molecules LM when the linear polarization passes through the liquid crystal layer LQ. Thus, at the ON time, at least part of light passing through the liquid crystal layer LQ is transmitted through the second polarizer PL2 (white display).

By virtue of the above structure, a normally-black mode is achieved.

In the liquid crystal display device having the above structure explained with reference to FIG. 2, pixels adjacent to each other in the second direction Y (for example, the pixels PX1 and PX4) take on the same color, and include respective pixel electrodes which are provided with slits extending in different directions. Thus, liquid crystal molecules LM of the pixels adjacent to each other in the second direction Y are aligned in different directions at the ON time. That is, the pixels adjacent to each other in the second direction Y and taking on the same color form two kinds of pseudo domains. In such a liquid crystal display device, odd-numbered rows of pixels and even-numbered rows of pixels in the second direction Y mutually compensate for the viewing angle. Thus, the viewing angle can be widened.

It should be noted that in the embodiment, the retardation film RE located between the array substrate AR and the first polarizer PL1 functions as a viewing-angle compensation film. To be more specific, in the black display at the OFF time or in the white display at the ON time, in the cases where the liquid crystal display device is viewed from the front and where it is viewed obliquely, the retardation film RE appropriately gives a phase difference to light transmitted through the liquid crystal display panel PNL, to thereby compensate for the difference in displayed state between the above cases.

As described above, according to the embodiment, the retardation film RE is attached to the surface of the array substrate AR, and the second polarizer PL2 attached to the surface of the counter-substrate CT is also attached to the cover member CG by the ultraviolet curing resin UC. Thus, from time when an uncured ultraviolet curing resin material is applied to time when it is cured as the ultraviolet curing resin UC, there is no possibility that the retardation film RE will contact the uncured ultraviolet curing resin material. It is therefore possible to prevent the retardation film RE from being damaged or changed in quality by the ultraviolet curing resin material. Thereby, it is possible to provide a liquid crystal display device which can restrict lowering of the reliability. It should be noted that the inventor did a temperature test to confirm if the liquid crystal display device according to the embodiment passes 250 cycles of rapid temperature changing of −40 to +85° C., and confirmed that the retardation film RE was not changed in quality or broken. Furthermore, the ultraviolet curing resin UC is in contact with not only the surface HF and side surface LF of the second polarizer PL2, but part of the surface CTa of the counter-substrate CT. That is, the ultraviolet curing resin UC contacts a lot of surfaces of the second polarizer PL2 and the counter-substrate CT, and can thus obtain satisfactory bonding strengths for the second polarizer PL2 and the counter-substrate CT.

Also, according to the embodiment, since the retardation film RE does not contact the uncured ultraviolet curing resin material, it is not necessary to use a retardation film RE having a high chemical resistance. Therefore, it is possible to more freely select the material of the retardation film RE. Also, the material of the ultraviolet curing resin UC can be selected without considering the chemical resistance of the retardation film RE. It is therefore possible to more feely select the material of the ultraviolet curing resin UC. Since the material of the retardation film RE and that of the ultraviolet curing resin UC can be more freely selected, the cost of the liquid crystal display device can be reduced.

In addition, the third absorption axis AB3 of the polarized sunglasses SG is substantially parallel to the second absorption axis AB2 of the second polarizer PL2. Thus, according to the embodiment, even if wearing the polarized sunglasses SG, the user can visibly recognize an image displayed on the liquid crystal display device. That is, it is possible to provide a liquid crystal display device supporting use of polarized sunglasses.

Next, a modification of the embodiment will be explained.

FIG. 6 is a cross-sectional view schematically showing another structure of the liquid crystal display device including the liquid crystal display panel PNL and the cover member CG.

In the modification, a cover member CG includes a touch sensor TP on a surface located opposite to the liquid crystal display panel PNL. In this regard, the modification is different from a structure of the embodiment as shown in FIG. 4. The other structure of the modification is the same as the other structure of the embodiment as shown in FIG. 4. Thus, the elements of the other structure of the modification are denoted by the same reference numbers as in the other structure of the embodiment as shown in FIG. 4, and their explanations will be omitted.

With respect to the above point, in the modification, the cover member CG comprises a support member SP and the touch sensor TP. The support member SP is formed of glass, resin or the like, which has a light transmitting property. The touch sensor TP is provided on a surface of the support member SP which is located opposite to the liquid crystal display panel PNL. The cover member CG is attached to a second polarizer PL2 by ultraviolet curing resin UC.

In such a modification also, the same advantage as in the above embodiment can be obtained.

It should be noted that with respect to the embodiment, it is explained above by way of example that the common electrode CE is provided as a first electrode, and the pixel electrode PE is provided as a second electrode including at least one slit; however, the pixel electrode PE and the common electrode CE may be disposed as the first electrode and the second electrode including the slit, respectively.

As explained above, according to the embodiment, it is possible to provide a liquid crystal display device which can restrict lowering of the reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
    a backlight unit;
    an array substrate including source lines arranged in a first direction, gate lines arranged in a second direction crossing the first direction, a common electrode, an insulating film stacked on the common electrode, a first pixel electrode stacked on the insulating film, a second pixel electrode stacked on the insulating film, and a first alignment film covering the first pixel electrode and the second pixel electrode;
    a counter-substrate including a second alignment film;
    a cover member;
    a liquid crystal layer between the array substrate and the counter-substrate;
    a first polarizer between the backlight unit and the array substrate; and
    a second polarizer between the counter-substrate and the cover member, wherein
    the liquid crystal layer includes negative liquid crystal molecules,
    an absorption axis of the second polarizer, a direction of initial alignment of the negative liquid crystal molecules, and a photo-alignment treatment direction of the second alignment film are substantially parallel,
    an absorption axis of the first polarizer is perpendicular to the absorption axis of the second polarizer,
    the first pixel electrode and the second pixel electrode overlap the common electrode,
    the second pixel electrode is located adjacent to the first pixel electrode in the second direction,
    the first pixel electrode has a first slit,
    a long axis of the first slit extends in a first extension direction crossing the photo-alignment treatment direction,
    the second pixel electrode has a second slit,
    a long axis of the second slit extends in a second extension direction different from the first extension direction,
    the first extension direction crosses the second direction at an acute angle in a clockwise direction, and is different from the first direction and the second direction, and
    the second extension direction crosses the second direction at an acute angle in a counterclockwise direction, and is different from the first direction and the second direction.

2. The liquid crystal display device of claim 1, wherein an angle between the first extension direction and the photo-alignment treatment direction is greater than 45° and less than 90°.

3. The liquid crystal display device of claim 1, wherein an angle between the first extension direction and the photo-alignment treatment direction is greater than 75° and less than 85°.

4. The liquid crystal display device of claim 3, wherein the first direction is substantially parallel to the absorption axis of the second polarizer, the direction of initial alignment, and the photo-alignment treatment direction.

5. The liquid crystal display device of claim 4, further comprising an ultraviolet curing resin bonding the second polarizer and the cover member, and a retardation film between the array substrate and the first polarizer, wherein the retardation film is not between the cover member and the counter-substrate.

6. The liquid crystal display device of claim 5, wherein
    the ultraviolet curing resin is in contact with part of the counter-substrate, which is exposed from the second polarizer to an outside thereof, and
    the ultraviolet curing resin is in contact with a side surface of the second polarizer.

7. The liquid crystal display device of claim 4, wherein
    the gate lines extend in the first direction, and
    the absorption axis of the second polarizer is parallel to short sides of an active area for use in displaying an image, and is parallel to the first direction.

8. The liquid crystal display device of claim 5, wherein the cover member comprises a touch sensor located on the ultraviolet curing resin.

9. The liquid crystal display device of claim 1, wherein the first pixel electrode and the second pixel electrode are disposed in adjacent pixels which take on the same color, and form two kinds of pseudo domains.

10. The liquid crystal display device of claim 7, wherein the first pixel electrode and the second pixel electrode are disposed in adjacent pixels which take on the same color, and form two kinds of pseudo domains.

11. The liquid crystal display device of claim 10, wherein the gate lines have a gate line, the gate line is electrically connected to the first pixel electrode, and a part of the second pixel electrode overlaps the gate line.

* * * * *